US012703078B2

(12) United States Patent
Sugar et al.

(10) Patent No.: US 12,703,078 B2
(45) Date of Patent: Aug. 11, 2026

(54) HIP EXOSKELETON FOR LIFTING AND PUSHING

(71) Applicant: Arizona Board of Regents on behalf of Arizona State University, Scottsdale, AZ (US)

(72) Inventors: Thomas Sugar, Chandler, AZ (US); Kevin Hollander, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 995 days.

(21) Appl. No.: 17/885,433

(22) Filed: Aug. 10, 2022

(65) Prior Publication Data

US 2022/0388150 A1 Dec. 8, 2022

Related U.S. Application Data

(63) Continuation of application No. PCT/US2021/017406, filed on Feb. 10, 2021.

(60) Provisional application No. 62/976,041, filed on Feb. 13, 2020.

(51) Int. Cl.
*B25J 9/00* (2006.01)

(52) U.S. Cl.
CPC .................................. *B25J 9/0006* (2013.01)

(58) Field of Classification Search
CPC ....... B25J 9/0006; B25J 9/123; A61H 1/0244; A61H 1/0255; A61H 3/00; A61H 2201/5084; A61H 2201/50; A61H 2201/165; A61H 1/0237; A61F 5/0102
See application file for complete search history.

(56) References Cited

U.S. PATENT DOCUMENTS

| | | | |
|---|---|---|---|
| 6,540,703 | B1 | 4/2003 | Lerman |
| 8,060,945 | B2 | 11/2011 | Adarraga |
| 8,171,570 | B2 | 5/2012 | Adarraga |
| 9,198,821 | B2 | 12/2015 | Unluhisarcikli et al. |
| 9,308,642 | B2 | 4/2016 | Sugar et al. |
| 9,662,262 | B2 | 5/2017 | Hollander et al. |
| 9,808,073 | B1 | 11/2017 | Maxwell et al. |
| 10,449,105 | B2 | 10/2019 | Hollander |

(Continued)

FOREIGN PATENT DOCUMENTS

| | | |
|---|---|---|
| CN | 105798886 | 7/2016 |
| EP | 3308912 | 4/2018 |

(Continued)

OTHER PUBLICATIONS

JPO, Office Action dated Jul. 22, 2024 in JP Serial No. 2023534130.

(Continued)

*Primary Examiner* — Brandy S Lee
*Assistant Examiner* — Rohan Patel
(74) *Attorney, Agent, or Firm* — SNELL & WILMER L.L.P.

(57) ABSTRACT

A hip assist actuation system is configured to allow a user to experience free movement of hip extension and hip flexion over a predetermined range and receive a torque assist in response to performing a lifting or pushing activity. The hip assist actuation system may be configured to determine whether the lifting or pushing activity is occurring and provide the torque assist in response to the determination.

20 Claims, 6 Drawing Sheets

(56) References Cited

U.S. PATENT DOCUMENTS

2005/0258210 A1 11/2005 Chu et al.
2007/0123997 A1 5/2007 Herr et al.
2008/0161738 A1* 7/2008 Giesen .................... A61F 5/026 602/19
2010/0094185 A1 4/2010 Amundson et al.
2011/0040216 A1 2/2011 Herr et al.
2014/0100493 A1* 4/2014 Craig ..................... B25J 9/0006 601/35
2014/0121573 A1* 5/2014 Kazerooni .............. A61F 5/026 601/23
2014/0276265 A1* 9/2014 Caires .................. A61H 1/0255 601/34
2014/0330431 A1 11/2014 Hollander et al.
2016/0023350 A1 1/2016 Holgate et al.
2016/0113831 A1* 4/2016 Hollander ................ A61H 3/00 623/32
2018/0064599 A1 3/2018 Kato et al.
2018/0116895 A1* 5/2018 Ikeuchi .................. G05B 15/02
2018/0177672 A1* 6/2018 Uchida ................ A61H 1/0237
2019/0142682 A1* 5/2019 Tung .................... A61H 1/0244 601/35
2019/0247264 A1 8/2019 Park et al.
2019/0380904 A1 12/2019 Panizzolo et al.
2022/0388150 A1 12/2022 Sugar et al.

FOREIGN PATENT DOCUMENTS

JP 2011025053 2/2011
JP 2018522747 8/2018
JP 2018199186 12/2018
WO 2012154580 11/2012
WO 2019161232 8/2019
WO WO-2020226882 A1 * 11/2020 ........... A61H 1/0244
WO 2021163153 8/2021

OTHER PUBLICATIONS

EPO, Extended European Search Report dated Aug. 8, 2024 in EP Serial No. 21904208.

ISA; International Search Report and Written Opinion dated Jun. 29, 2021 in PCT/US2021/017406.

ISA; International Search Report and Written Opinion dated Feb. 18, 2022 in PCT/US2021/062081.

EPO, Supplementary Partial European Search Report and Written Opinion dated May 1, 2024 in EP Serial No. 21754427.9.

Sugar, T.G. et al. "Wearable Robots for Worker Assistance".http://archive.wmsym.org/2017/pdfs/FinalPaper_17464_0130124949.pdf.

Sugar, T., et al. "HeSA, Hip Exoskeleton for Superior Assistance". SpringerLink, vol. 16, pp. 319-323, Oct. 5, 2016, https://link.springer.com/chapter/10.1007/978-3-319-46532-6_52.

ISA; International Search Report and Written Opinion No. PCT/US2021/017406 dated Jun. 29, 2021.

ISA ; International Preliminary Report On Patentability No. PCT/US2021/017406 dated Aug. 11, 2022.

Martin, B., et al. "Aerial Porter Exoskeleton (APEX) for Lifting and Pushing." 2022. Wearable Robotics: Challenges and Trends. Biosystems & Biorobotics. https://doi.org/10.1007/978-3-03069547-7_85.

Asbeck, A., et al. "Soft Exosuit for Hip Assistance," Robotics and Autonomous Sys. 2014.

Martin, M.B., et al., "Development and Testing of the Aerial Porter Exoskeleton (APEx)," Oct. 5, 2021.

Hollander, KW, et al. "A Passive and Active Joint Torque Augmentation Robot (JTAR) for Hip Gait Assistance", ASME IDETC 2014, DETC2014-35654, Buffalo, NY.

Hollander, KW, et al. "A Joint Torque Augmentation Robot (JTAR) for Ankle Gait Assistance", ASME IDETC 2014, DETC2014-35653, Buffalo, NY.

Hollander, KW, et al. Design of the Orthotic Load Assistance Device (OLAD), Dynamic Walking, Pensacola, FL.

Kerestes, J., et al. "Adding and Subtracting Energy to Body Motion—Phase Oscillator,", IDETC 2014.

ISA; International Search Report and Written Opinion No. PCT/US2021/062081 dated Feb. 18, 2022.

U.S. Bureau of Labor Statistics, "Back injuries prominent in work-related musculoskeletal disorder cases in 2016," 2018.

Seo, K., et al. "Autonomous hip exoskeleton saves metabolic cost of walking uphill," IEEE . . . International Conference on Rehabilitation Robotics : [proceedings], vol. 2017,pp. 246-251, 2017.

Schmalz, T., et al. "Biomechanical and metabolic effectiveness of an industrial exoskeleton for overhead work," International journal of environmental research and public health, vol. 16, No. 23, 2019.

Gregorczyk, K. N., et al. "Effects of a lower-body exoskeleton device on metabolic cost and gait biomechanics during load carriage," Ergonomics, vol. 53, No. 10, pp. 1263-1275, 2010.

Sado, F., et al. "Design and control of a wearable lowerbody exoskeleton for squatting and walking assistance in manual handling works," Mechatronics, vol. 63, p. 102272, 2019.

Sado, F., et al. "Exoskeleton robot control for synchronous walking assistance in repetitive manual handling works based on dual unscented kalman flter," PloS one, vol. 13, No. 7, p. e0200193, 2018.

Kim, S., et al. "Assessing the influence of a passive, upper extremity exoskeletal vest for tasks requiring arm elevation: Part II—"unexpected" effects on shoulder motion, balance, and spine loading," Applied ergonomics, vol. 70, pp. 323-330, 2018.

Kim, S., et al. "Assessing the influence of a passive, upper extremity exoskeletal vest for tasks requiring arm elevation: Part I—"expected" eects on discomfort, shoulder muscle activity, and work task performance," Applied ergonomics, vol. 70, pp. 315-322, 2018.

Young, A. J., et al. "Influence of power delivery timing on the energetics and biomechanics of humans wearing a hip exoskeleton," Frontiers in bioengineering and biotechnology, vol. 5, p. 4, 2017.

Bequette, B., et al. "Physical and cognitive load effects due to a powered lower-body exoskeleton," Human factors, vol. 62, No. 3, pp. 411-423, 2020.

Pons, J. L. Wearable robots: Biomechatronic exoskeletons. Hoboken N.J.: Wiley, 2008.

Aliman, N., et al. "Design and development of lower limb exoskeletons: A survey," Robotics and Autonomous Systems, vol. 95, pp. 102-116, 2017.

Weston, E. B., et al. "Biomechanical evaluation of exoskeleton use on loading of the lumbar spine," Applied ergonomics, vol. 68, pp. 101-108, 2018.

Kazerooni, H., et al. "On the control of the berkeley lower extremity exoskeleton (bleex)," in Proceedings of the 2005 IEEE International Conference on Robotics and Automation, pp. 4353-4360, IEEE, Apr. 18-22, 2005.

Kilicarslan, A., et al. "High accuracy decoding of user intentions using eeg to control a lower-body exoskeleton," Annual International Conference of the IEEE Engineering in Medicine and Biology Society. IEEE Engineering in Medicine and Biology Society. Annual International Conference, vol. 2013, pp. 5606-5609, 2013.

Yousif, H. A., et al. "Assessment of muscles fatigue based on surface emg signals using machine learning and statistical approaches: A review," IOP Conference Series: Materials Science and Engineering, vol. 705, p. 012010, 2019.

Kazerooni, H., et al. "Hybrid control of the berkeley lower extremity exoskeleton (bleex)," The International Journal of Robotics Research, vol. 25, No. 5-6, pp. 561-573, 2006.

Dollar, A. M., et al. "Lower extremity exoskeletons and active orthoses: Challenges and state-of-the-art," IEEE Transactions on Robotics, vol. 24, No. 1, pp. 144-158, 2008.

Browning, R.C., et al. "The effects of adding mass to the legs on the energetics and biomechanics of walking," Medicine and science in sports and exercise, vol. 39, No. 3, pp. 515525, 2007.

Gordon, C.C., et al. "2012 anthropometric survey of u.s. army personnel: Methods and summary statistics."

GoX Studio, "GoX Studio introduces GoX Ergo, Wearable Sensors to Improve Worker Wellness and Safety." Mar. 2018.

(56) References Cited

OTHER PUBLICATIONS

Gillette, J. C., et al. "Electromyographic assessment of a shoulder support exoskeleton during on-site job tasks," IISE Transactions on Occupational Ergonomics and Human Factors, vol. 7, No. 3-4, pp. 302-310, 2019.

* cited by examiner

HIP EXOSKELETON FOR LIFTING AND PUSHING

CROSS REFERENCE TO RELATED APPLICATIONS

This application is continuation of, claims priority to and the benefit of, PCT/US21/17406, filed Feb. 10, 2021 and entitled "Hip Exoskeleton for Lifting and Pushing," which claims priority to and the benefit of U.S. Provisional Patent Application No. 62/976,041, filed on Feb. 13, 2020, and entitled "Hip Exoskeleton for Lifting and Pushing." The disclosure of the foregoing applications are incorporated herein by reference in their entirety, including but not limited to those portions that specifically appear hereinafter, but except for any subject matter disclaimers or disavowals, and except to the extent that the incorporated material is inconsistent with the express disclosure herein, in which case the language in this disclosure shall control.

FEDERALLY SPONSORED RESEARCH OR DEVELOPMENT

This invention was made with government support under FA8606-19-C-0018 awarded by the Air Force Office of Scientific Research. The government has certain rights in the invention.

TECHNICAL FIELD

The present disclosure relates to robotic systems, and in particular to exoskeletons for use in connection with improving human capability.

BACKGROUND

Back pain is one of the largest drivers of workplace injury and lost productivity in industries around the world. In particular, back injuries are one of the leading reasons for days away from work across all occupations. Back pain often occurs due to repetitive lifting by a worker. As such, to assist in hip motion, to stabilize the back of a user, and to assist a lifting motion, a hip exoskeleton for lifting and pushing may be desirable.

SUMMARY

A hip assist actuation system is disclosed herein. In various embodiments, the hip assist actuation system comprises: a support structure; a lever mechanism pivotably coupled to the support structure, the lever mechanism includes an upper arm extending away from a pivot point in a first direction and a lower arm extending away from the pivot point in a second direction; and a drive mechanism comprising a free mode configuration and an engaged mode configuration, wherein: in response to being in the engaged mode configuration, the drive mechanism is configured to apply a torque assist to the upper arm over a predetermined range of hip extension angles, in response to being in the free mode configuration, the drive mechanism is configured to allow free motion of the lever mechanism, and the hip assist actuation system is configured to transition from the free mode configuration to the engaged mode configuration in response to a hip extension angle of a user exceeding a threshold hip extension angle.

In various embodiments, the drive mechanism may comprise a linear actuator, the linear actuator configured to translate and drive the lever mechanism to apply the torque assist. The drive mechanism may comprise: an electric motor; a screw operably coupled to the electric motor; and a glide element configured to translate along the screw in response to the screw rotating. The screw may define a drive axis, and the glide element is configured to translate along the drive axis and apply an assisting force to the lever mechanism. The hip assist actuation system may further comprise a pulley system operably coupled to the electric motor and the drive mechanism. The hip assist actuation system may further comprise a controller in operable communication with the electric motor, the controller configured to activate the electric motor in response to determining whether a lifting or pushing activity is being performed by the user. The lower arm of the lever mechanism may be configured to be coupled to a leg attachment mechanism of an exoskeleton.

A hip assist actuation system for an exoskeleton is disclosed herein. The hip assist actuation system may comprise: a first sensor, a first motor, and a controller in operable communication with the first sensor and the first motor. The controller is operable to: receive, via the controller, sensor data from the first sensor; determine, via the controller, whether a hip extension of a user has exceeded a predetermined threshold based on the sensor data; and command, via the controller, the first motor to rotate in response to the hip extension exceeding the predetermined threshold, wherein the first motor is configured to drive a drive mechanism and provide a torque assist to a lever mechanism.

In various embodiments, the hip assist actuation system may further comprise a second sensor and a third sensor in operable communication with the controller, wherein receiving the sensor data further includes receiving the sensor data from the first sensor and the second sensor. The first sensor, the second sensor, and the third sensor may be inertial measurement units (IMUs). The hip assist actuation system may further comprise a second motor, wherein: the first motor is configured to be disposed proximate a first thigh of the user in operation, and the second motor is configured to be disposed proximate a second thigh of the user. The first motor and the second motor may be operable independently or in unison. Operations of the controller may further comprise: determining via the controller, whether the hip extension of the user has fallen below the predetermined threshold based on the sensor data, and commanding, via the controller, the drive mechanism to return to a base position, the base position allowing the lever mechanism to pivot freely. Operations of the controller may further comprise: determining via the controller, whether the user is performing one of a pushing or lifting activity based on the sensor data, and commanding, via the controller, the drive mechanism to provide the torque assist to the lever mechanism in response to determining the user is performing one of the pushing or lifting activity. An exoskeleton is disclosed herein. The exoskeleton may comprise: a first support structure, a first leg attachment mechanism configured to couple to a first leg of a user, and a first lever mechanism pivotably coupled to the first support structure, the first lever mechanism including an upper arm extending away from a pivot point and a lower arm extending away from the pivot point, the lower arm coupled to the first leg attachment mechanism. The first lever mechanism is configured to pivot freely in a first mode, and the first lever mechanism is configured to receive an assist force to the upper arm in a second mode. The first lever mechanism is configured to transition from the first mode to the second mode in response to a hip extension angle of the user exceeding a threshold hip extension angle.

In various embodiments, the exoskeleton may further comprise a second support structure, and a second leg attachment, and a second lever mechanism, the second leg attachment configured to couple to the first leg of the user, the second lever mechanism in accordance with the first lever mechanism. A drive mechanism may provide the assist force. The drive mechanism may include a linear actuator. The drive mechanism may include an electric motor configured to translate a glide element into the upper arm of the first lever mechanism and provide the assist force. The exoskeleton may further comprise a back support system and a housing, the housing configured to partially house the first lever mechanism, the back support system configured to provide lumbar support to the user.

BRIEF DESCRIPTION OF THE DRAWINGS

With reference to the following description and accompanying drawings.

DETAILED DESCRIPTION

Figure 1A:
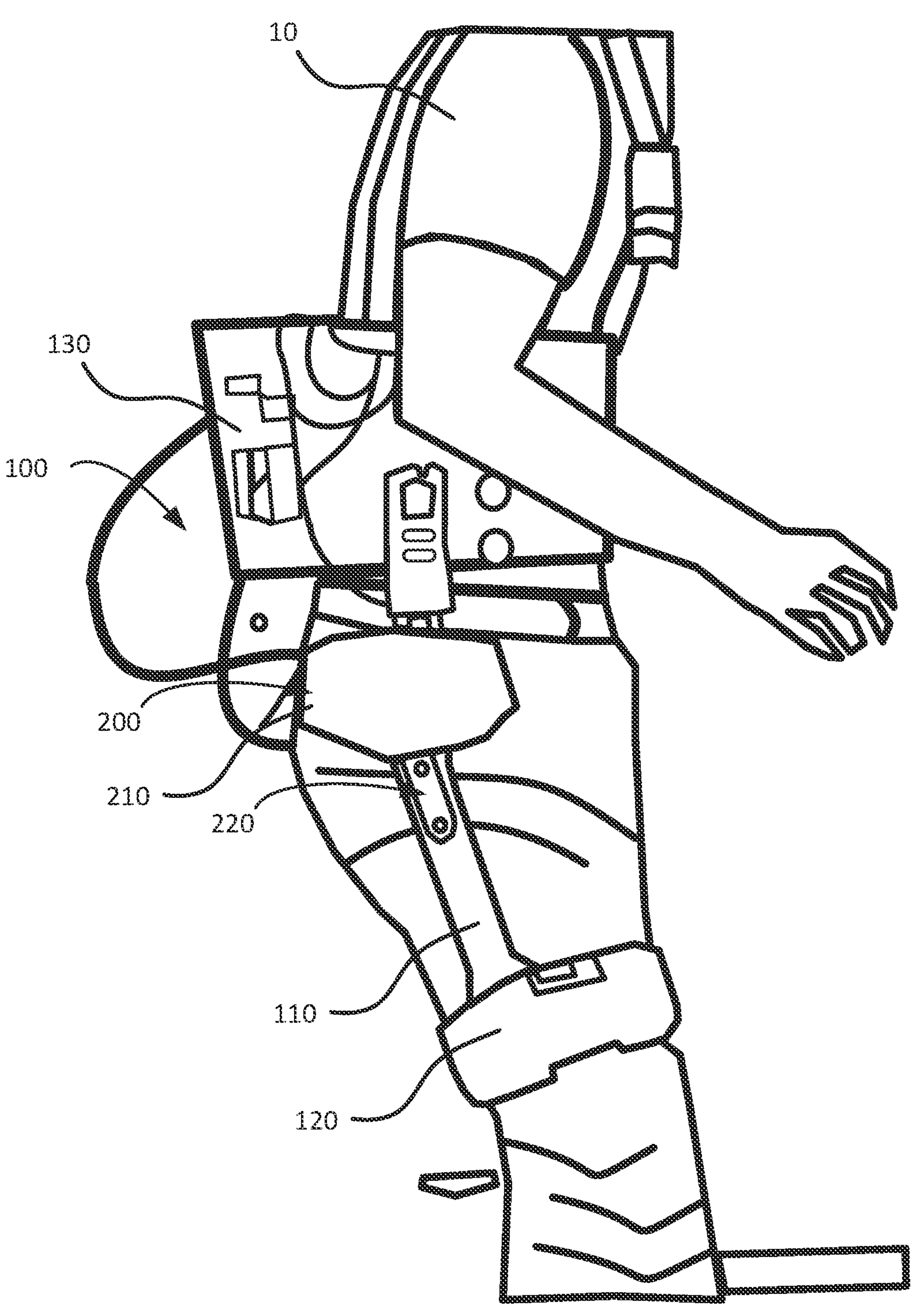
FIG. 1A illustrates an exemplary hip exoskeleton system in accordance with various exemplary embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques and components for wearable robotic systems may not be described in detail herein. Furthermore, the connecting lines shown in various figures contained herein are intended to represent exemplary functional relationships and/or physical couplings between various elements. It should be noted that many alternative or additional functional relationships or physical connections may be present in exemplary hip exoskeleton systems and/or components thereof.

Wearable robotic systems, as disclosed herein, can assist workers to push and lift heavy objects, palletize, and perform tasks with less fatigue. Unfortunately, there is a limited pool of younger workers currently available and the existing workforce is older and aging. Thus, it is desirable to improve worker ergonomics, prevent injuries to reduce health-care costs, and improve worker wellness. For example, more U.S. healthcare dollars are spent treating back and neck pain than almost any other medical condition.

Prior approaches to wearable robotic systems have offered limited performance improvements, been unduly bulky, cumbersome, or heavy. Moreover, most exoskeleton devices do not allow for free motion and hinder walking and running gait. When wearing conventional exoskeleton devices, it feels like you are walking in a swimming pool. In contrast, in accordance with principles of the present disclosure, an exemplary hip exoskeleton can assist human movement, for example, when lifting an object in a squatting position, or when pushing an object, in each instance by assisting hip extension. By providing a system configured to assist with hip extension when lifting and pushing only, exemplary systems allow for free motion in other tasks, improving the user experience.

An exoskeleton with a hip assist actuation system is disclosed herein. The exoskeleton provides assistance through a targeted range of motion, for example about 67 degrees. However, a larger range of motion, for example up to about 75 degrees, or a smaller range of motion, for example down to about 50 degrees, may be utilized. In this manner, exoskeleton 100 may be utilized to support heavy pushing and/or lifting activities.

In various embodiments, the exoskeleton does not include any components at or near the level of a user's feet/shoes. This is advantageous as the worker may be moving inside of cramped areas and there can be objects on the ground such as transfer balls.

Additionally, those skilled in the art will recognize that turning around and pushing with your back is easier on the legs. This occurs because the lumbar region is supported; some of the weight of the user is supported by friction between the object and the back; the heels are touching the ground, and the large muscles in the front of the leg and the calf muscles are used to extend the shank. However, particularly in warehouse environments, this motion is not recommended because the user is not holding onto the cargo. An alternative, pulling the heavy object, is not ergonomically correct.

Pushing a large object is difficult because the legs must support the mass of the body; the heel is off of the ground; the pelvis and lumbar region must resist the pushing force; and it is difficult to extend the thigh and knee from a flexed position.

Lifting objects is difficult as well because it is hard to extend the thigh and knee from a flexed position when performing a squat lift. Many users prefer a stooped lift because it is a less energetic movement requiring less muscle work from the legs. The squat lift is better for the lower back, but it takes more energy to perform the motion and it is hard to extend the thigh and knee from a flexed position.

To address these and other challenges, exemplary exoskeletons disclosed herein are portable, lightweight, and support the lower back by applying an extension torque to assist the legs when pushing and lifting.

Referring now to FIG. 1A, an exoskeleton 100 with a hip assist actuation system 200 is illustrated, in accordance with an exemplary embodiment. In various embodiments, the exoskeleton 100 may weigh less than 8 pounds and be operable with less than 40 watts of power. In the exoskeleton 100, a hip exoskeleton structure supports and protects the lower back. Moreover, the exoskeleton 100 may be powered (for example via a battery or batteries and an electric motor or motors), as described further herein. In some embodiments, the exoskeleton 100 may deliver up to 50 watts of usable power. The exoskeleton 100 may deliver up to 1 watt of usable power, 5 watts of usable power, 10 watts of usable power, 15, 20 watts of usable power, 21 watts of usable power, 22 watts of usable power, 23 watts of usable power, 24 watts of usable power, 25 watts of usable power, 30 watts of usable power, 35 watts of usable power, 40 watts of usable power, 45 watts of usable power, 50 watts of usable power, or any range between these values. In some embodiments, the exoskeleton 100 may deliver up to 30 Newton-meters of force to assist in extending the thigh(s) of a user. The exoskeleton 100 may deliver up to 1 Newton-meters of force, 2 Newton-meters of force, 5 Newton-meters of force, 10 Newton-meters of force, 15 Newton-meters of force, 20 Newton-meters of force, 25 Newton-meters of force, 30 Newton-meters of force, or any range between these values. For example, the exoskeleton 100 may deliver about 22 watts of usable power and about 15 Newton-meters of force to assist in extending the thigh(s) of a user. Additionally, the exoskeleton 100 may include various components for user comfort and/or wearability, for example a comfortable pad disposed in front of the leg.

In operation, exoskeleton 100 offers limited resistance and is thus essentially "transparent" to the user during walking and will not assist the legs reducing the power and energy requirements of the device. Additionally, it is easy to walk around in exoskeleton 100. The motors are off, or idle, during walking so exoskeleton 100 is silent or near-silent. Additionally, exoskeleton 100 is configured with a unique lever arm (e.g., lever mechanism 220) that can be mechanically engaged and disengaged, automatically. Via these and other principles, a user of exoskeleton 100 gains performance benefits without excessive compromise of capability. For example, a user (e.g., user 10) of exoskeleton 100 will be able to get in and out of vehicles/machinery.

In various embodiments for exoskeleton 100, snag hazards and pinch points may be reduced and/or eliminated in order to provide an improved user experience. Additionally, if the battery of exoskeleton 100 is discharged or disabled, exoskeleton 100 may implement a "graceful degradation" of capabilities whereby user movements are not hindered until exoskeleton 100 is removed.

Additionally, the exoskeleton 100 may be configured with motors that are easily attachable and/or detachable, allowing for simplified installation and/or replacement of electric motors. Moreover, each motor may be independently controllable or they can be controlled in unison if so desired.

Yet further, in various exemplary embodiments exoskeleton 100 utilizes a lever arm that is disengageable, for example while the user is walking or running. In this manner, battery life is improved while simultaneously allowing for a more natural gait and movement of the user during motions where exoskeleton 100 is not providing assistive force.

In various embodiments, the exoskeleton 100 comprises the hip assist actuation system 200, an arm 110 and a leg attachment mechanism 120, and a back support system 130. The hip assist actuation system 200 includes a housing 210 and a lever mechanism 220. In various embodiments, the lever mechanism 220 is configured to provide assistance with push and/or lift only methodology, as described further herein. The lever mechanism 220 may be partially disposed within the housing 210. In various embodiments, the arm 110 is coupled to the lever mechanism 220 and extends to the leg attachment mechanism 120. When the exoskeleton 100 is in use, the arm 110 may extend along a length of a leg of a user (e.g., user 10) from a location proximal the hip to a location proximal a knee of the user.

In various embodiments, the leg attachment mechanism 120 is configured to couple to a leg of a user (e.g., user 10). Thus, the leg attachment mechanism 120 may comprise any suitable attachment mechanism known in the art, such as a strap with hook and loop fasteners, a clip attachment, a buckle attachment, or the like. The leg attachment mechanism 120 may be spring loaded to assist in coupling to a leg of a user. Similarly, the back support system 130 may be configured to couple to a waist of a user (e.g., user 10). The back support system 130 may further include pads, or padding, to support a lumbar region of a user (e.g., user 10).

In various embodiments, the exoskeleton 100 includes the arm 110 and the leg attachment mechanism 120 for each leg. For example, a first arm in accordance with arm 110 and a first leg attachment mechanism in accordance with leg attachment mechanism 120 may be configured to couple to a first (e.g., right) leg of a user, and a second arm in accordance with arm 110 and a second leg attachment mechanism in accordance with leg attachment mechanism 120 may be configured to couple to a second (e.g., left) leg of a user. In this regard, hip assist actuation system 200 is configured to provide support to a right hip and a left hip of a user during pushing and lifting activities.

Exoskeleton 100 may be configured to be disconnected from the leg motion when walking and running and to allow for free motion when walking. In this regard, the hip assist actuation system 200 may be configured to be in synchrony with a user (e.g., user 10) during operation, as described further herein. For example, in a lifting task, a person will squat down, and exoskeleton 100 assists the legs when the object and the center of mass of the human move upward. Thereafter, exoskeleton 100 is disengaged and will allow for free walking motion, for example in order to palletize an object. Thus, the hip assist actuation system 200 may be configured to determine the lifting task is being performed and assist at a predetermined time in response to the determination.

Via use of exoskeleton 100, a user can walk and maneuver freely when holding heavy objects. Additionally, exoskeleton 100 is an assistive exoskeleton that reduces lumbar forces and back injuries. For example, back support system 130 provides additional lumbar and back support during hip assist from the hip assist actuation system 200. In various embodiments, back support system 130 comprises a waist belt for supporting the lumbar region of a user 10. Additionally, exoskeleton 100 may comprise padding or other materials to support the lumbar region and improve user comfort. Yet further, use of exoskeleton 100 can enhance productivity of an aging and older workforce.

Figure 1B:
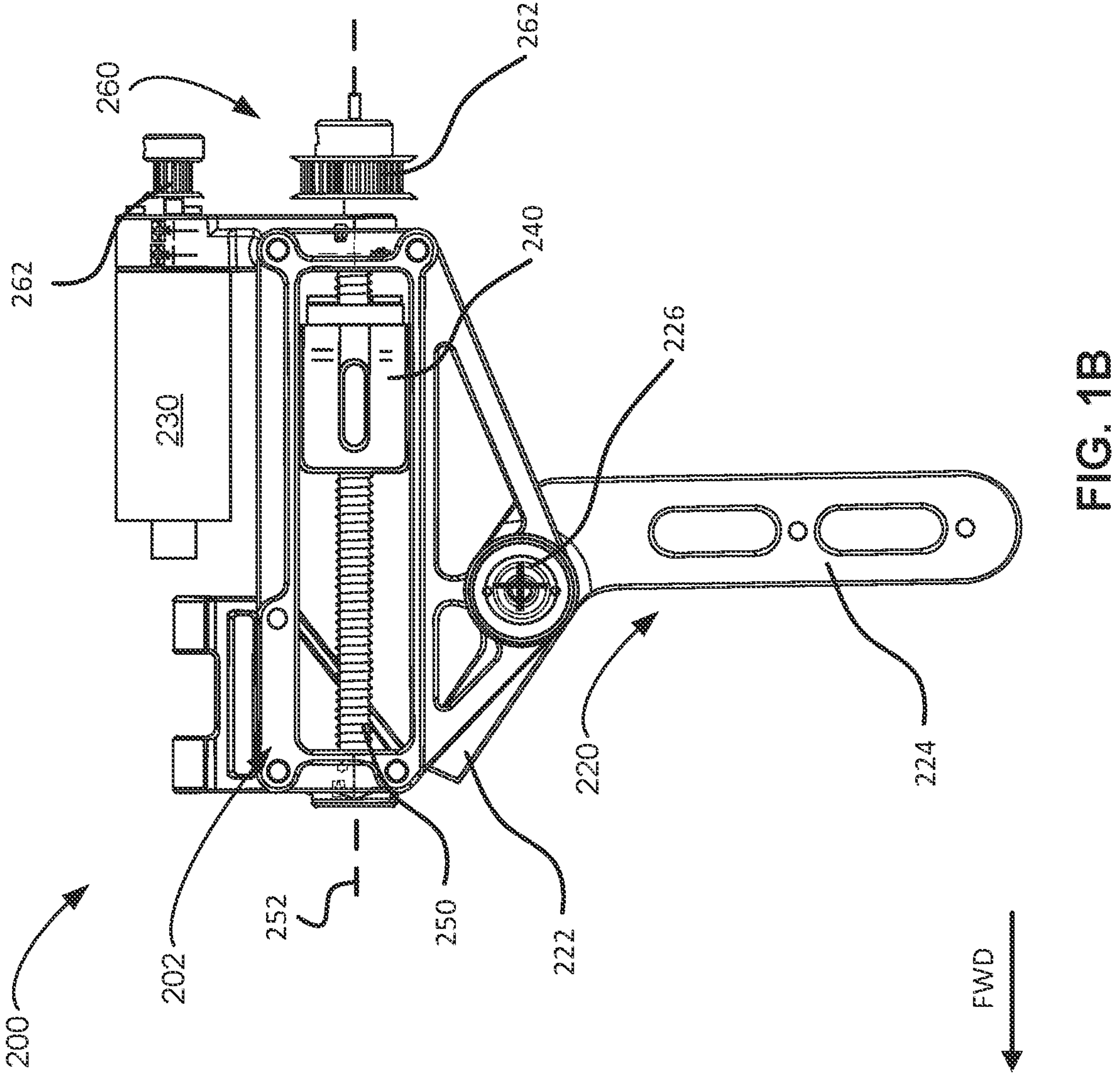
FIG. 1B illustrates components of an exemplary hip exoskeleton system in accordance with various exemplary embodiments.

Referring now to FIG. 1B, the hip assist actuation system 200 on a first side of the exoskeleton 100 (i.e., a left side looking right) with the housing 210 from FIG. 1 removed for clarity is illustrated, in accordance with various embodiments. In various embodiments, the hip assist actuation system 200 further comprises an electric motor 230, a glide element 240 and a support structure 202. In various embodiments, the glide element 240 is a traveling screw (e.g., a ball screw, a lead screw, a roller screw, or any other suitable linear guide element known in the art). Although the glide element 240 is illustrated as a linear actuator, the present disclosure is not limited in this regard. For example, one skilled in the art may recognize various embodiments where a rotary actuator may be utilized in a hip assist actuation system 200.

In various embodiments, the hip assist actuation system 200 further comprises a guide element (e.g., ball screw 250) defining a drive axis 252 of the hip assist actuation system 200. In various embodiments, the electric motor 230 is operably coupled to the lead screw 250 (e.g., via a pulley system 260) and configured to rotate the ball screw 250 during operation of the hip assist actuation system. In response to the ball screw 250 rotating, the glide element 240 travels along the drive axis 252 (e.g., forward when providing lift assist and aft when returning to a default position). Although illustrated as including the pulley system 260, the present disclosure is not limited in this regard. For example, the electric motor 230 could be coupled directly to the ball screw 250, in accordance with various embodiments. In various embodiments, by having a hip assist actuation system 200 without a pulley system 260, the hip assist actuation system 200 may have fewer components, but the electric motor 230 would be customized for the hip assist actuation system, which may result in greater manufacturing cost, size and weight. In various embodiments, the electric motor 230 may be structurally mounted to the support structure 202.

In various embodiments, hip assist actuation system 200 for exoskeleton 100 may be assembled and/or built with commercial components in order to reduce system cost and/or ensure a desired level of reliability. For example, commercial electric motors and motor controllers may be utilized. Additionally, exoskeleton 100 may be geared for extending the hips in a controlled motion to support lifting and pushing of large objects.

In various embodiments, the lever mechanism 220 that provides assistance may be configured with a push and/or lift only methodology and can be seen in FIG. 1B with upper arm 222 of the lever mechanism 220. By virtue of this design, the upper arm of the lever mechanism 220 will be free to move for most movements, not inhibiting leg motion. When assistance is needed, the glide element 240 will travel towards the upper arm 222 of the lever mechanism 220 and push against the upper arm 222 to assist motion of the human leg. In operation, the electric motor 230 moves the glide element 240 as described previously herein. In particular, the electric motor rotates the ball screw 250, causing the glide element 240 to travel forward (to the left) and push against the upper arm 222 to assist certain movements, such as a leg extension from a squatting position. In various embodiments, the electric motor 230 may rotate a first pulley 262 in the pulley system 260, which rotates a second pulley 264 in the pulley system 260, which in turn rotates the ball screw 250. The pulleys 262, 264 moves the glide element 240 to the left and to the right via the ball screw 250. In various embodiments, pulleys 262, 264 of the pulley system 260 may be configured to increase the torque and/or reduce the speed relative to a system without the pulleys 262, 264.

In various embodiments, the glide element 240 is used to engage the upper arm 222 of the lever mechanism 220 and cause the lever arm to rotate about a pivot point 226. In this regard, the lever mechanism 220 is pivotably coupled to the support structure 202. In response to the upper arm 222 rotating about the pivot point 226, a lower arm 224 of the lever mechanism pivots about the pivot point as well. The lower arm 224 is coupled to the arm 110 from FIG. 1, which provides hip assistance for a user during a lifting or pushing activity. The glide element 240 pushes against the upper arm 222 of the lever mechanism 220 to create an assistive torque applied at the lower arm 224 to a user (e.g., user 10 from FIG. 1). When a torque is created about the pivot point 226 (e.g., a rotatable joint), the torque is applied through the lower arm 224 and arm 110 from FIG. 1 and into the leg via the leg attachment mechanism 120 from FIG. 1.

It will be appreciated that exemplary systems as disclosed herein allow for free motion during certain tasks or movements, while providing an assistive torque during other tasks or movements. In particular, the electric motor 230 may be configured to receive sensor data as described further herein. In various embodiments, the sensor data may be used (e.g., by a controller or the like), to determine whether a user is performing a lifting or pushing task. When a user is not performing a lifting or pushing task, the electric motor 230 may be off, or in an idle state. Thus, lever mechanism 220 may be configured to move freely (i.e., without contacting the glide element), when the electric motor 230 is in an off or idle state and the glide element 240 is in a default, or home, position. Moreover, exemplary principles and methods disclosed herein in connection with the hip may desirably be applied to other human joints, such as the ankle, the knee, the elbow, and so forth.

It should be noted that if the motor is accidently turned off, the arm 222 can push the glide element 240 backwards (to the right) so that the glide element 240 is manually pushed back into the home position. In this way, the user is not stuck in an uncomfortable position.

In operation, exoskeleton 100 is configured with a motor default position being home (e.g., Free Mode). Free Mode is silent or very quiet in operation, with minimal power usage. Additionally, Free Mode may be configured with components configured to capture a small amount of energy from the normal walking of a user, thus re-charging a battery or otherwise preparing exoskeleton 100 to assist with heavy lifting or pushing tasks from time to time.

Figure 2:
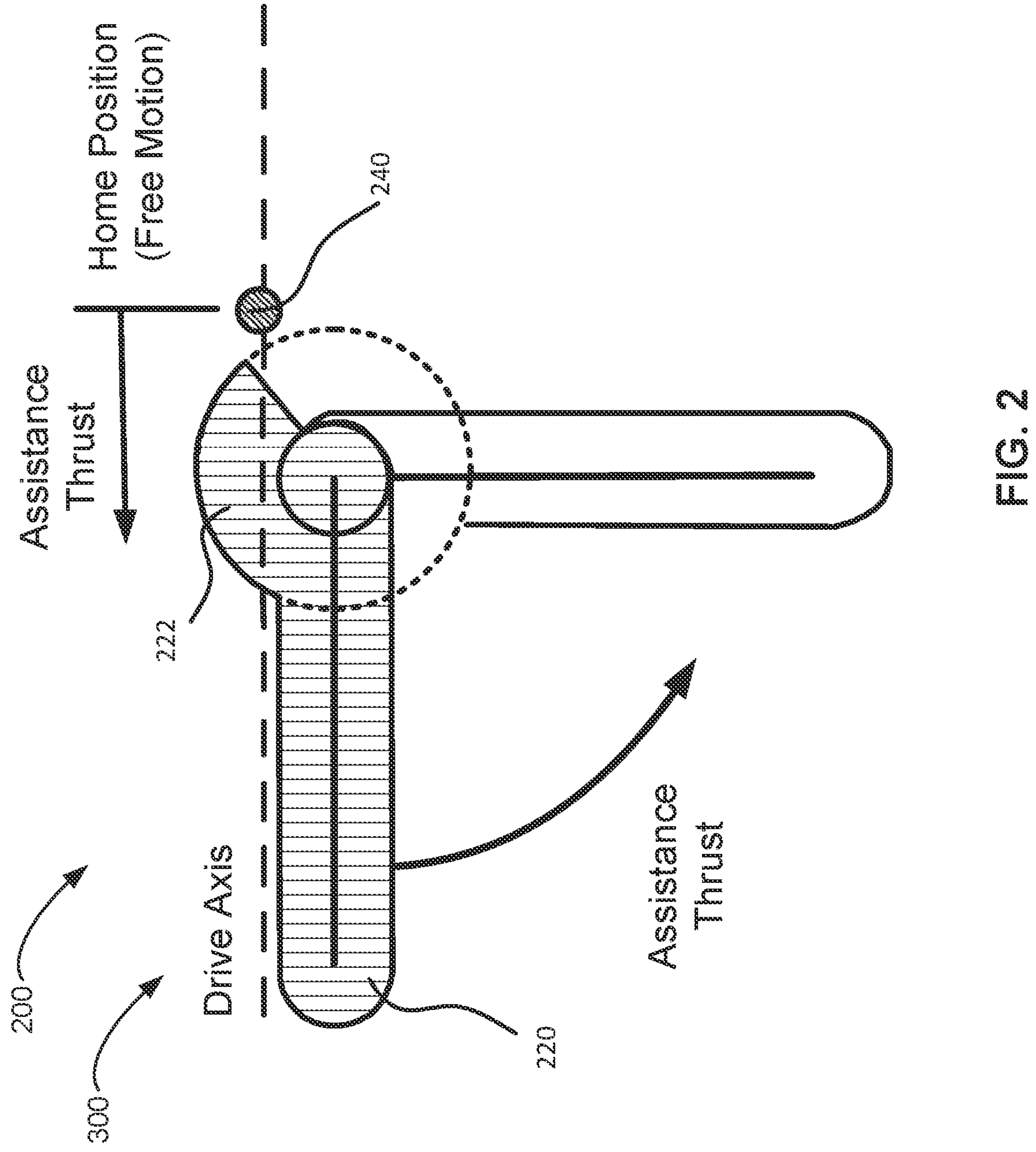
FIG. 2 illustrates operational principles of an exemplary hip exoskeleton system in accordance with various exemplary embodiments.

Referring now to FIG. 2, a schematic view of the glide element 240 interaction with the lever mechanism 220 is illustrated, in accordance with various embodiments. In various embodiments, a drive mechanism 300 of exoskeleton 100 provides uni-directional thrust, aiding hip extension as a "lift assist". The drive mechanism 300 includes the glide element 240 (e.g., a drive pin), which pushes against the upper arm 222 of the lever mechanism 220 from FIG. 1B to assist hip extension. In various embodiments, the glide element 240 is configured to travel linearly along the drive axis 252 to contact and provide an assistive force to the lever mechanism 220. The glide element 240 may be activated for targeted periods via the electric motor from FIG. 1B, for example during pushing and lifting only. In other modes such as walking, the glide element 240 may be moved to the right and will not interfere with the lever mechanism 220.

In various embodiments, when in use, as illustrated in FIG. 2, the drive mechanism 300 of the hip assist actuation system travels linearly and contacts the upper arm 222 of the lever mechanism 220, providing an assistive thrust to the lever mechanism for a pre-determined range of motion, as described previously herein. The pre-determined range of motion is a design variable, which may be set based on a desired range of hip assist during lifting and pushing activities.

Figure 3:
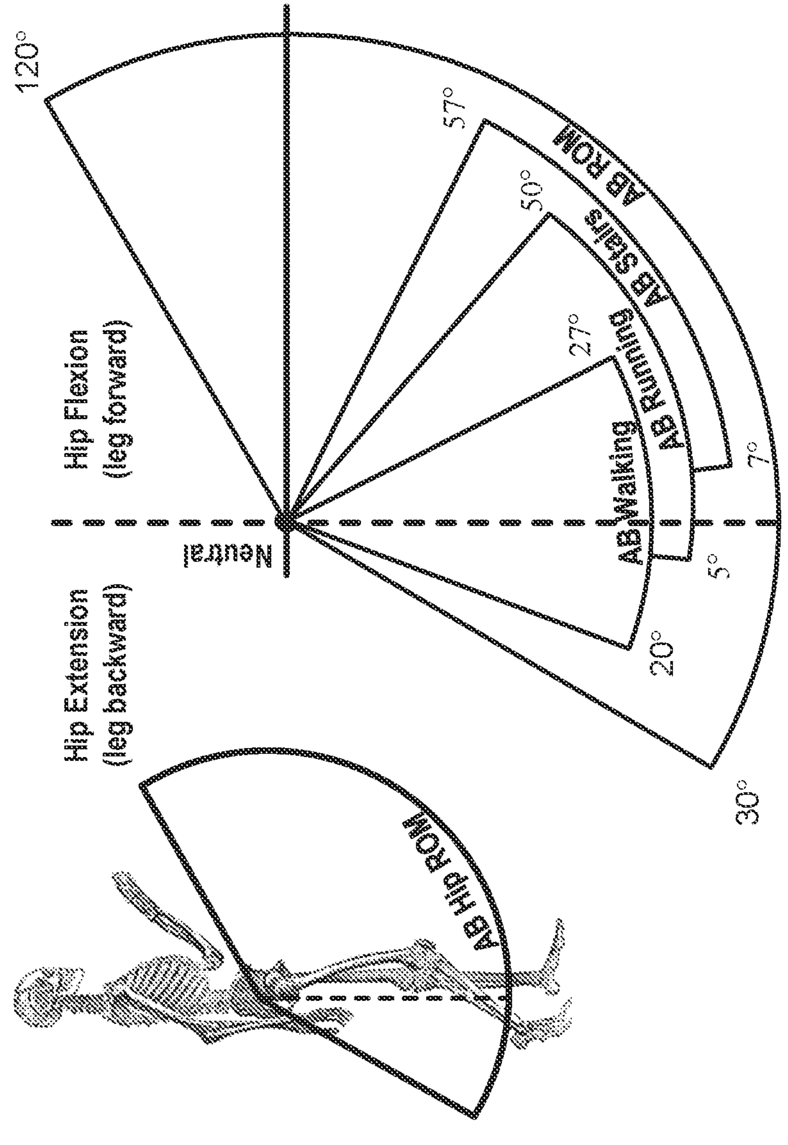
FIG. 3 illustrates forces provided by an exemplary hip exoskeleton system in accordance with various exemplary embodiments.

Turning now to FIG. 3, in various exemplary embodiments exoskeleton 100 is configured to provide assistive forces over a selected range of motion. For example, exoskeleton 100 may supply torque to extend the leg of a user, as illustrated by the arrow in FIG. 2. In some exemplary embodiments, exoskeleton 100 supplies torque to extend the hip when the hip is flexed from about 64 degrees to about 27 degrees. For example, as shown in Table 1 below, a typical walking range of motion includes a maximum hip extension (leg moving backwards) of 20 degrees, and a maximum hip extension for a total range of motion is approximately 30 degrees. Additionally, a maximum hip extension during running for a typical person is approximately 5 degrees and typically does not occur when walking up stairs. Thus, a typical user is unlikely to experience a hip extension greater than approximately 27 degrees during typical activities, such as walking, running, or climbing the stairs.

TABLE 1

Hip Extension and Hip Flexion for Typical Range of Motion

| Range of Motion | Reference Source | Hip Extension | Hip Flexion | Total ROM | ROM Center |
|---|---|---|---|---|---|
| Total ROM | Warren 1979 | 30° | 120° | 150° | 45° |
| Walking | Whittle 1996 | 20° | 27° | 47° | 3.5° |
| Running | Novacheck 1998 | 5° | 50° | 55° | 22.5° |
| Stairs | Protopappadaki 2006 | — | 7° to 64° | 57° | 35.5° |

In various embodiments, the hip assist actuation system 200 as shown in FIGS. 1A-2 is configured to automatically provide assistive torque in response to a user flexing his or her hip between approximately 27 and 64 degrees; i.e., the hip assist actuation system 200 from FIGS. 1A-2 may be configured to provide a hip assist (e.g., a torque/lift assist) to the user until an angle of the flexed hip returns to 27 degrees or less. However, any suitable range of hip flexion may be utilized, as desired. Exoskeleton 100 may be utilized to extend the hip during lifts and squats. In various embodiments, a greater range of hip extension to accommodate a user squatting to lift an object. For example, a user may exhibit a hip extension as deep as 110 degrees. Thus, in various embodiments, the hip actuation system 200 may be configured to provide assistive torque in response to a user flexing his or her hip between approximately 27 and 110 degrees, or approximately 40 and 110 degrees for a squatting motion by a respective user.

Figure 4:
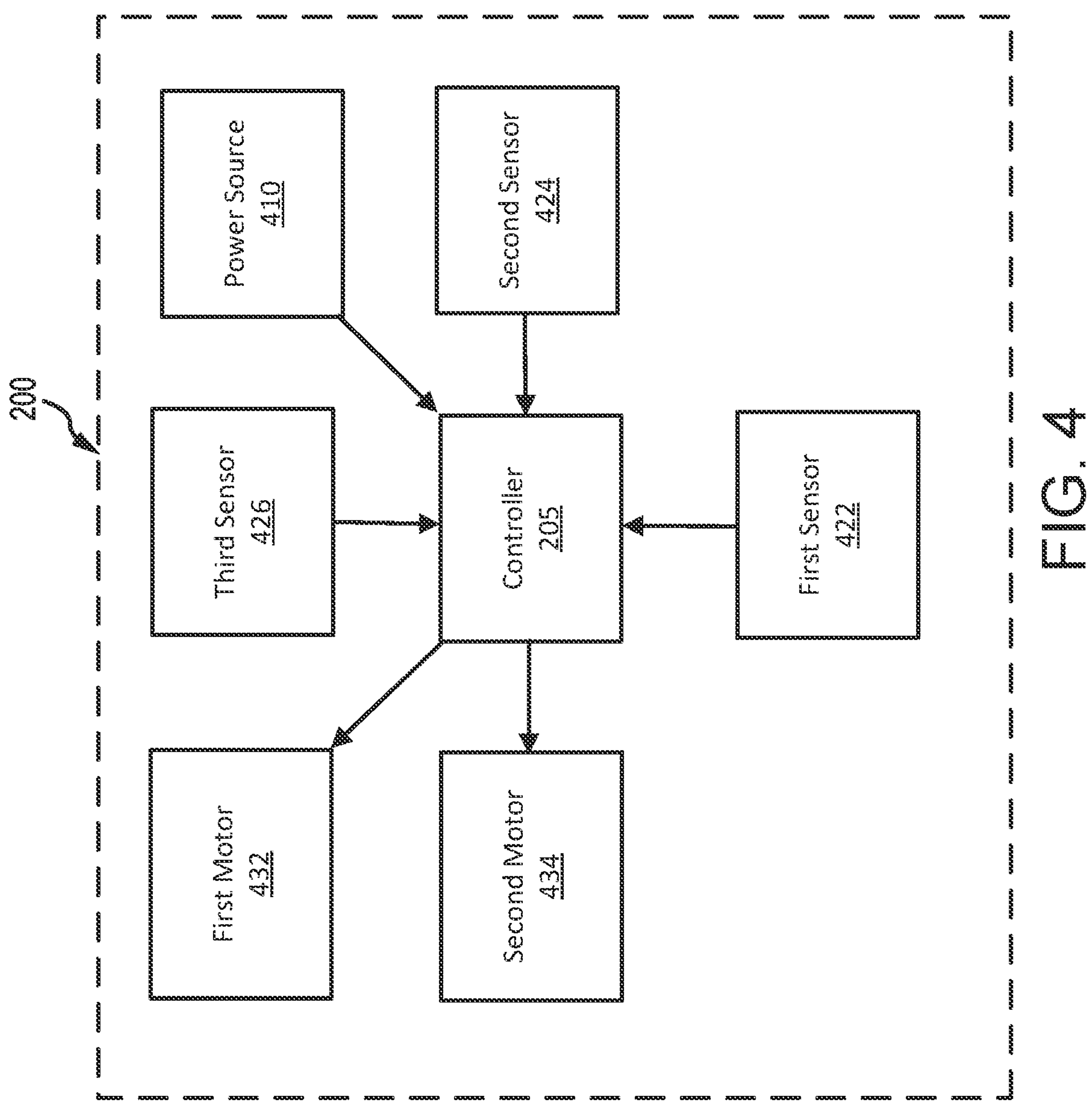
FIG. 4 illustrates a control system for an exemplary hip exoskeleton system, in accordance with various exemplary embodiments.

Referring now to FIG. 4, a schematic block diagram of a hip assist actuation system 200 for use in the exoskeleton 100 from FIG. 1A is illustrated, in accordance with various embodiments. Hip assist actuation system 200 may further comprise a controller 205 in electrical communication with at least one sensor (e.g., sensors 422, 424, 426) and at least one motor (e.g., motors 432, 434), and a power source 410. In various embodiments, first motor 432 may be a left side motor of the hip assist actuation system 200 (e.g., configured to be disposed proximate a left leg of a user when in use). Similarly, second motor 434 may be a right side motor of the hip assist actuation system 200 (e.g., configured to be disposed proximate a right leg of a user when in use). In various embodiments, a single motor may be utilized and placed only along a single side of the user. In various embodiments, a single motor may be utilized and be configured to actuate a left side glide element and a right side glide element via a pulley system (e.g., pulley system 260).

In various embodiments, the at least one sensor is configured to provide sensor data to the controller 205. In various embodiments, the controller may be configured to use the sensor data to determine whether a user is engaged in a lifting or pushing activity. In various embodiments, the controller is configured to command a motor of the hip assist actuation system 200 to rotate in a first direction in response to determining the user is engaged in a lifting or pushing activity. In response to the rotation of the motor, a drive mechanism (e.g., drive mechanism 300 from FIG. 2) may translate towards and contact a lever mechanism (e.g., lever mechanism 220 from FIGS. 1B-2). In various embodiments, controller 205 may be integrated into a microcontroller disposed within the housing 210, the back support system 130, and/or the leg attachment mechanism 120 from FIG. 1A. Similarly, in various embodiments, the at least one sensor may be disposed in the leg attachment mechanism 120, the housing 210, and/or the back support system 130.

In various embodiments, controller 205 may be configured as a central network element or hub to access various systems and components of hip assist actuation system 200. Controller 205 may comprise a network, computer-based system, and/or software components configured to provide an access point to various systems and components of hip assist actuation system 200. In various embodiments, controller 205 may comprise a processor. In various embodiments, controller 205 may be implemented in a single processor. In various embodiments, controller 205 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 205 may comprise a processor configured to implement various logical operations in response to execution of instructions, for example, instructions stored on a non-transitory, tangible, computer-readable medium configured to communicate with controller 205. In various embodiments, the power source 410 may comprise a battery.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, each sensor (e.g., sensors 422, 424, 426) may comprise an inertial measurement unit (IMU) sensor. Although described herein with respect to IMU sensors, any suitable sensor configured to determine whether a lifting or pushing activity is occurring is within the scope of this disclosure, such as accelerometer sensors, gyro sensors, angular sensors and/or a combination of the three. In various embodiments, IMU sensors may reduce a number of sensors, since IMU sensors are able to provide two to six degrees of freedom to a controller 205. In various embodiments, the hip assist actuation system comprises a first sensor 422 (e.g., an IMU sensor) disposed proximate a first thigh of a user when in use (e.g., in housing 210 or leg attachment mechanism 110), a second sensor 424 (e.g., an IMU sensor) disposed proximate a second thigh of a user when in use (e.g., opposite side of first thigh in similar position), and a third sensor 426 (e.g., an IMU sensor) disposed proximate a pelvis of a user (e.g., in housing 210).

In various embodiments, input from the sensors (e.g., sensors 422, 424, 426) may be processed by one or more computing devices (e.g., controller 205) associated with exoskeleton 100 from FIG. 1A, in order to determine human activity, and the motors (e.g., motors 432, 434) of exoskeleton 100 may be configured to assist hip extension during pushing and lifting only. In this regard, the controller 205 is configured to receive orientation and positional data from the sensors 422, 424, 426, and determine (1) whether hip extension has exceeded a predetermined threshold (e.g., 27 degrees in various embodiments), and (2) when an angle of the hip extension begins to decrease (e.g., when a lifting or pushing step is beginning). Furthermore, the controller 205 is configured to command an electric motor (e.g., first motor 432 and/or second motor 434) to rotate in response to the lifting or pushing step beginning, resulting in actuation of a glide element (e.g., glide element 240 from FIGS. 1B and 2) into a lever mechanism (e.g., lever mechanism 220 from FIGS. 1A-2) to provide a lift or push assist to a user, in accordance with various embodiments.

In various exemplary embodiments, the controller for the hip assist actuation system 200 of the exoskeleton 100 from FIG. 1A may utilize a phase oscillator controller, for example as disclosed in U.S. Pat. No. 9,308,642 entitled "Systems and Methods for Adding or Subtracting Energy to Body Motion", the contents of which are hereby incorporated by reference in their entirety (except for any subject matter disclaimers or disavowals, and excepting any conflict with the express disclosure herein, in which case this disclosure shall control). Phase-based controllers are particularly advantageous because they are time invariant. Time invariant controllers are robust against disturbances. In contrast, time-based controllers function poorly during unexpected events and can have instabilities. Via use of an appropriate controller 205, hip assist actuation system 200 for exoskeleton 100 may be utilized while still allowing the user to walk, walk backwards, run, and/or climb stairs without using a state-based machine that can have errors.

Figure 5:
FIG. 5 illustrates a logic for the control system for an exemplary hip exoskeleton system, in accordance with various exemplary embodiments.
Figure 5:
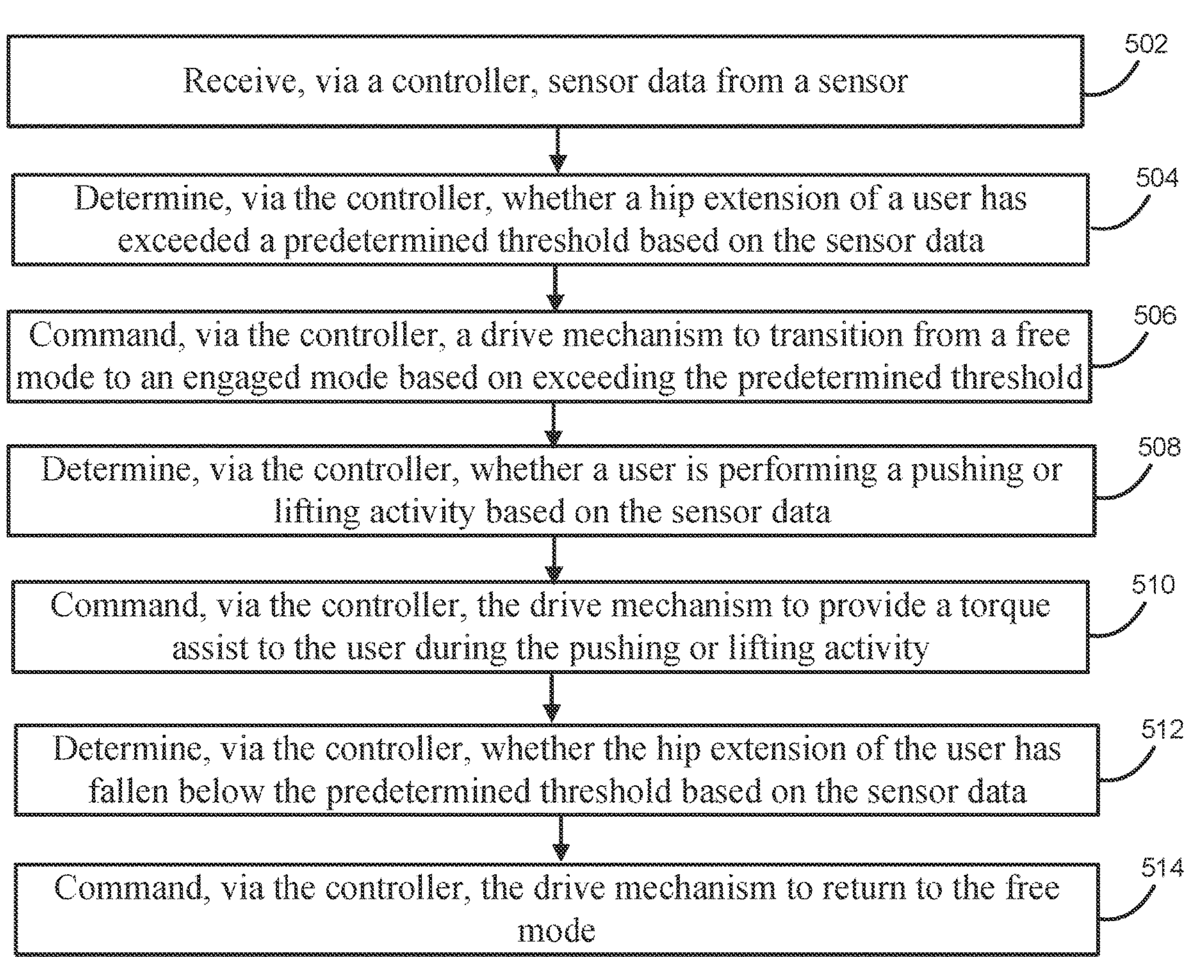

Referring now to FIG. 5, a method of providing a hip assist to a user is illustrated in accordance with various embodiments. The method 500 may comprise receiving, via a controller (e.g., controller 205 from FIG. 4), sensor data from a sensor (step 502). In various embodiments, sensor data may be received from a single sensor or multiple sensors. In various embodiments, the method utilizes multiple sensors (e.g., sensors 422, 424, 426 from FIG. 4).

The method 500 may further comprise determining, via the controller, whether a hip extension of a user has exceeded a predetermined threshold based on the sensor (step 504). In various embodiments, the predetermined threshold may be outside of a typical maximum hip extension during walking, running, or climbing stairs.

The method 500 may further comprise commanding, via the controller, a drive mechanism to transition from a free mode to an engaged mode based on exceeding the predetermined threshold (step 506). In various embodiments, when the drive mechanism (e.g., drive mechanism 300 from FIG. 3) is in a free mode, the drive mechanism is configured to allow a lever mechanism to move freely (i.e., not inhibit movement such as walking, running or climbing of a user). In various embodiments, the engaged mode is when a glide element (e.g., glide element 240) of the drive mechanism (e.g., drive mechanism 300) is configured to engage an arm of a lever mechanism (e.g., lever mechanism 220). Thus, in the engaged mode, the drive mechanism 300 is positioned to provide an assistive torque in response a user beginning to lift or push an object as described further herein.

The method 500 may further comprise determining, via the controller, whether a user is performing a pushing or lifting activity based on the sensor data (step 508). For example, the sensor data may indicate when hip extension angle changes from increasing to decreasing (i.e., a user has reached a lowest point in a squat and is beginning to stand back up). Thus, by determining a shift from a hip extension angle increasing to a hip extension angle decreasing, after the predetermined threshold for hip extension has been passed, the controller may determine a user is beginning a lifting or pushing phase of his or her activity.

The method 500 may further comprise commanding, via the controller, a drive mechanism (e.g., drive mechanism 300 from FIG. 3) to provide a torque assist to the user during the pushing or lifting phase (step 510). In this regard, the drive mechanism may provide a torque assist during a predetermined range of hip flexion (e.g., between 75 degrees and 25 degrees, or between 67 degrees and 27 degrees, 110 to 40 degrees, or the like).

The method 500 may further comprise determining, via the controller, whether the hip extension of the user has fallen below the predetermined threshold based on the sensor data (step 512). In this regard, the controller may determine that the lifting or pushing by the user is complete or near complete, in accordance with various embodiments.

The method 500 may further comprise commanding, via the controller, the drive mechanism to return to the free mode (step 514). As described previously herein, the free mode will allow the user to walk, run, or climb steps normally without being inhibited while carrying a load or after pushing a load, in accordance with various embodiments.

A hip exoskeleton is disclosed herein. The hip exoskeleton may comprise: a first exoskeleton portion forming the upper part of a rotatable joint; a second exoskeleton portion forming the lower part of a rotatable joint; a first retention mechanism to couple the first exoskeleton portion to a user at a location above the user's hip joint; a second retention mechanism to couple the second exoskeleton portion to a user at a location below the user's hip joint; and a drive pin, wherein the drive pin is position able in a first position and a second position, wherein, in the first position, the drive pin is movable by a motor to apply an extension force to the rotatable joint, and wherein, in the second position, the rotatable joint may move freely without contacting the drive pin.

A hip exoskeleton is disclosed herein. The hip exoskeleton may comprise a lever arm rotatable about a rotatable joint, wherein the lever arm comprises a first portion and a second portion, wherein the first portion of the lever arm is attached to the body of a user, and wherein the second portion of the lever arm is selectably pushable via a motor to assist body motion when desired while allowing free motion when desired.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure. For example, a selectably pushable device could be used at the hip, knee, ankle, elbow, wrist, shoulder, or neck.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A hip assist actuation system, comprising:

a support structure;

a lever mechanism pivotably coupled to the support structure, the lever mechanism includes an upper arm extending away from a pivot point in a first direction and a lower arm extending away from the pivot point in a second direction; and a drive mechanism comprising a free mode configuration and an engaged mode configuration, wherein:

in response to being in the engaged mode configuration, the drive mechanism is configured to apply a torque assist to the upper arm over a predetermined range of hip extension angles, in response to being in the free mode configuration, the drive mechanism is configured to allow free motion of the lever mechanism, and the hip assist actuation system is configured to transition from the free mode configuration to the engaged mode configuration in response to a hip extension angle of a user exceeding a threshold hip extension angle, wherein the hip extension angle is defined as an angle between a neutral zero degree axis and a hip extension of a user from the neutral zero degree axis, and wherein the neutral zero degree axis is defined by a user standing.

2. The hip assist actuation system of claim 1, wherein the drive mechanism comprises a linear actuator, the linear actuator configured to translate and drive the lever mechanism to apply the torque assist.

3. The hip assist actuation system of claim 1, wherein the drive mechanism comprises:

an electric motor;

a screw operably coupled to the electric motor; and a glide element configured to translate along the screw in response to the screw rotating.

4. The hip assist actuation system of claim 3, wherein:

the screw defines a drive axis, and the glide element is configured to translate along the drive axis and apply an assisting force to the lever mechanism.

5. The hip assist actuation system of claim 3, further comprising a pulley system operably coupled to the electric motor and the drive mechanism.

6. The hip assist actuation system of claim 3, further comprising a controller in operable communication with the electric motor, the controller configured to activate the electric motor in response to determining whether a lifting or pushing activity is being performed by the user.

7. The hip assist actuation system of claim 1, wherein the predetermined threshold is 27 degrees from the neutral zero degree axis.

8. A hip assist actuation system for an exoskeleton, the hip assist actuation system comprising:

a first sensor;

a first motor;

a controller in operable communication with the first sensor and the first motor, the controller operable to:

receive, via the controller, sensor data from the first sensor;

determine, via the controller, whether a hip extension angle of a user has exceeded a predetermined threshold based on the sensor data;

command, via the controller, a drive mechanism to transition from a free mode to an engaged mode in response to the hip extension angle exceeding the predetermined threshold; and command, via the controller, the first motor to rotate in response to the hip extension angle exceeding the predetermined threshold, wherein the first motor is configured to drive the drive mechanism and provide a torque assist to a lever mechanism, wherein the hip extension angle is defined as an angle between a neutral zero degree axis and a hip extension of a user from the neutral zero degree axis, and wherein the neutral zero degree axis is defined by a user standing.

9. The hip assist actuation system of claim 8, further comprising a second sensor and a third sensor in operable communication with the controller, wherein receiving the sensor data further includes receiving the sensor data from the first sensor and the second sensor.

10. The hip assist actuation system of claim 9, wherein the first sensor, the second sensor, and the third sensor are inertial measurement units (IMUs).

11. The hip assist actuation system of claim 9, further comprising a second motor, wherein:

the first motor is configured to be disposed proximate a first thigh of the user in operation, and the second motor is configured to be disposed proximate a second thigh of the user.

12. The hip assist actuation system of claim 11, wherein the first motor and the second motor are operable independently.

13. The hip assist actuation system of claim 8, wherein operations of the controller further comprise:

determining, via the controller, whether the hip extension angle of the user has fallen below the predetermined threshold based on the sensor data, and commanding, via the controller, the drive mechanism to return to a base position, the base position allowing the lever mechanism to pivot freely.

14. The hip assist actuation system of claim 8, wherein operations of the controller further comprise:

determining via the controller, whether the user is performing one of a pushing or lifting activity based on the sensor data, and commanding, via the controller, the drive mechanism to provide the torque assist to the lever mechanism in response to determining the user is performing one of the pushing or lifting activity.

15. An exoskeleton, comprising:

a first support structure;

a first leg attachment mechanism configured to couple to a first leg of a user;

a first lever mechanism pivotably coupled to the first support structure, the first lever mechanism including an upper arm extending away from a pivot point and a lower arm extending away from the pivot point, the lower arm coupled to the first leg attachment mechanism, wherein:

the first lever mechanism is configured to pivot freely in a first mode;

the first lever mechanism is configured to receive an assist force to the upper arm in a second mode; and the first lever mechanism is configured to transition from the first mode to the second mode in response to a hip extension angle of the user exceeding a threshold hip extension angle, wherein the hip extension angle is defined as an angle between a neutral zero degree axis and a hip extension of a user from the neutral zero degree axis, and wherein the neutral zero degree axis is defined by a user standing.

16. The exoskeleton of claim 15, further comprising a second support structure, and a second leg attachment, and a second lever mechanism, the second leg attachment configured to couple to a second leg of the user, the second lever mechanism in accordance with the first lever mechanism.

17. The exoskeleton of claim 15, wherein the assist force is provided by a drive mechanism.

18. The exoskeleton of claim 17, wherein the drive mechanism includes a linear actuator.

19. The exoskeleton of claim 17, wherein the drive mechanism includes an electric motor configured to translate a glide element into the upper arm of the first lever mechanism and provide the assist force.

20. The exoskeleton of claim 15, further comprising a back support system and a housing, the housing configured to partially house the first lever mechanism, the back support system configured to provide lumbar support to the user.

* * * * *